Sept. 15, 1964  H. SENIOR ETAL  3,148,489
METHOD OF PRODUCING A FILLED PACKAGE
Filed Nov. 14, 1960  2 Sheets-Sheet 1
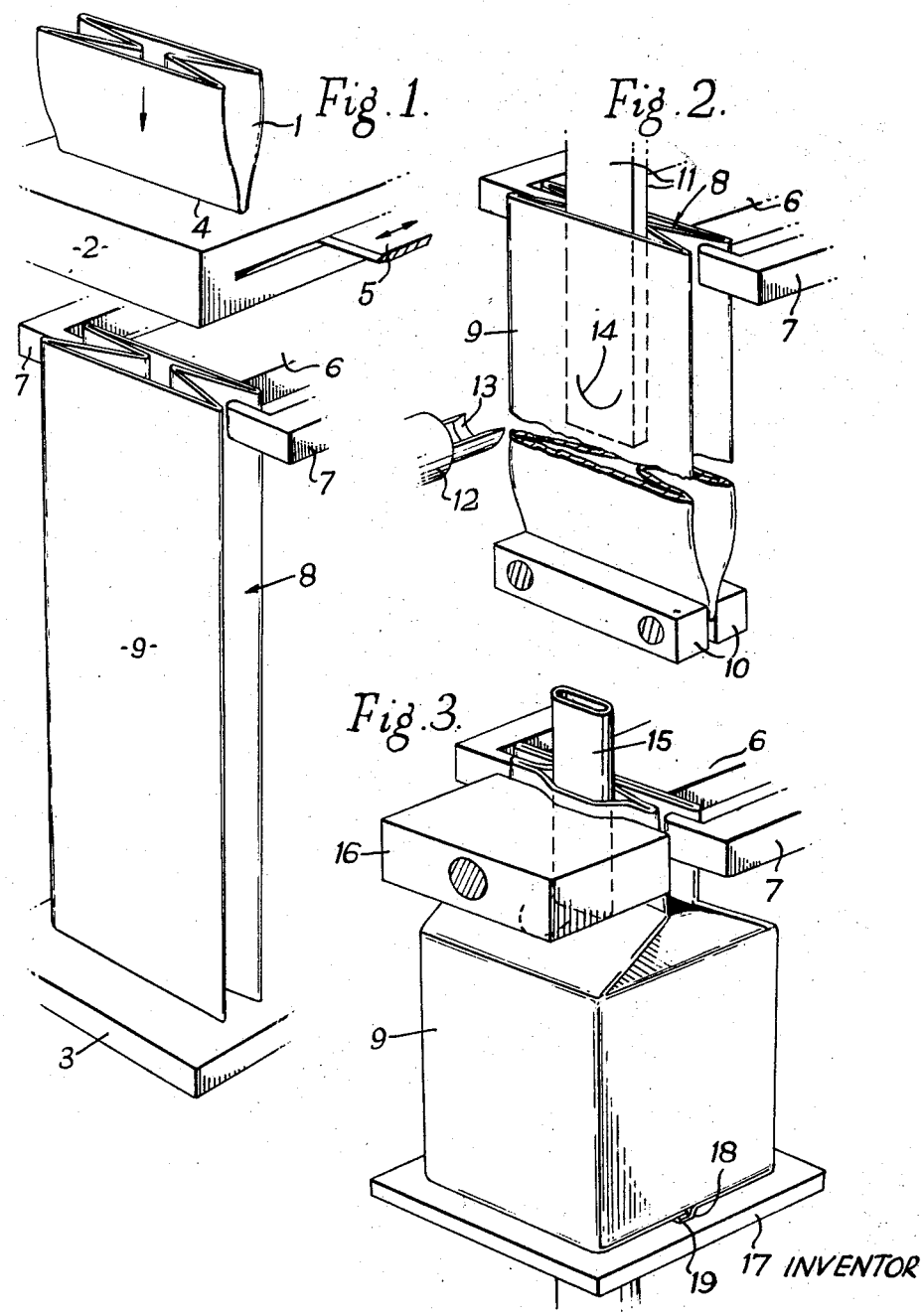
INVENTOR
BY
ATTORNEY

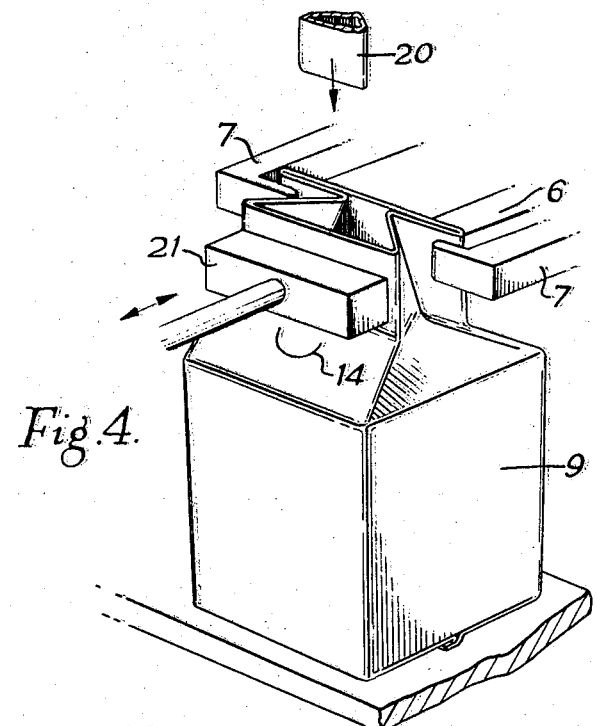
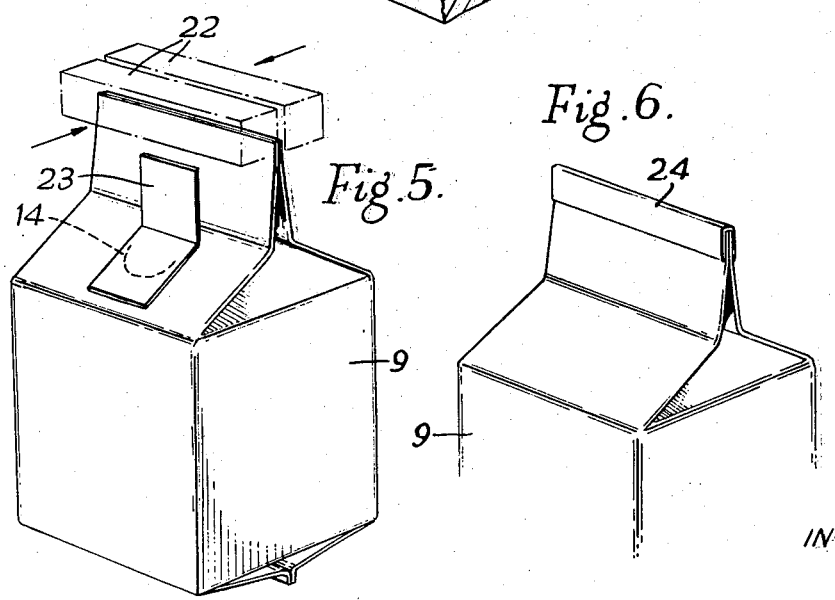

3,148,489
METHOD OF PRODUCING A FILLED PACKAGE
Henry Senior, Leicester, and John Leonard Holden, Hinckley, England, assignors to The British Xylonite Company Limited, London, England, a British company
Filed Nov. 14, 1960, Ser. No. 69,175
Claims priority, application Great Britain Nov. 19, 1959
5 Claims. (Cl. 53—14)

This invention is concerned with packages for the vending of liquids, such as milk, fruit juices, oils, and so on, pasty or other semi-solids, such as ice cream, and powders and other granular materials.

Various methods, resulting in different forms of products, have been pursued in the past in the search for cheap and discardible liquid containers. A familiar example are waxed containers for milk. These attempts have, however, usually for reasons of cost, not met with general sucess. It is believed that the present applicants have succeeded in overcoming, with their novel package and methods of production thereof, the defects and handicaps associated with these earlier attempts.

Thus the method of the present invention comprises transversely heat-seaming a length of semi-rigid thermoplastic tubing to constitute the bottom of the package, forming the body of the package to shape by blocking out this bottom, closing the package before or after charging the same, and adhering an external tab, strip, wafer or the like thereto to identify the position of an access opening to the closed package.

As will be appreciated, an important factor of this package and in its use lies in the heat-sealable material of which it is made. A number of materials offer themselves for the purpose and the ultimate choice may depend on the particular use for which the package is destined and its intended contents.

It is also a criterion that the package shall be self-supporting and not distorted or flabby when filled and standing on its block bottom, and the selected material will take this into account. Tests have already indicated that low-pressure or linear polyethylene eminently fulfils this condition and has the added attributes that a wide variety of substances can be packaged therein over lengthy periods without leakage or contamination, and without deterioration of the package, and that it can withstand relatively high and low temperatures, thus suiting it to the packaging of hot and very cold materials, and for example for cold storage in a deep freeze.

Beyond this, in the case of many packaged commodities foil or sheet thermoplastics of various kinds, such as polyethylene, polypropylene, polycarbamates, or nylon will be appropriate, and so-called thermoplastic alloys (i.e. mixtures of thermoplastics), laminates of thermoplastic sheet materials, or other sheet materials, for instance metal foils, paper, paperboard, regenerated cellophane, coated or lined with a thermoplastic.

Again, chemically-active contents may determine the material used. In the case of mineral oils, for example, semi-rigid polyvinyl chloride, which is inert to chemical attack by such oils, is indicated.

The tubing for the individual packages can be of various initial conditions; thus it could be of layflat form, e.g. with longitudinal gussets, or formed by the seaming together of the longitudinal edges of a travelling web of thermoplastic sheet material. Preferably the packages will be fabricated from a length of parent tubing, cut into sections for the individual packages at an appropriate stage in the manufacture, e.g. immediately prior to the folding and sealing of the block bottom. This tubing may be drawn initially from a flattened stock on a reel or from any other suitable supply, or may be formed continuously as the package-fabrication proceeds, for example by wrapping a thermoplastic web around a mandrel and providing it with a longitudinal heat-sealed closure seam, or by direct extrusion from a die.

The bottom of the package is conveniently defined, particularly in the case of gussetted tubing, by a single transverse seam. This seam can be applied by clamping the tubing between heated jaws, by passing it between the electrode plates of a high-frequency welding device (if the di-electric constant of the material makes it suitable), by clamping it between presser cheeks and flame-fusing the material, or in other fashion. The formation of this bottom seam may be performed substantially simultaneously with, or before or after, the severance of the package blank concerned from a length of parent stock, and will preferably be positioned adjacent and alongside the line, or intended line, of severance. In any event it is intended that the distance between the two shall not be more than half the width of the width of the intended block bottom. If the "tail" beyond the seam is of any substantial length less than this, it can be turned back and, if convenient and desirable, heat-sealed to the block bottom when the latter has been formed.

According to a further feature of the invention the bottom of the package is positively acted on, to shape and block it out by the application of internal pressure, with or without the application of a mechanical counter-pressure externally against the bottom. The internal pressure is preferably applied by blowing, into the bottom-seamed article, air or gas which is directed towards this bottom to open out the tube at this part.

To assist in positively shaping the bottom at this stage and to give it a form which, by virtue of the qualities of the semi-rigid material, e.g. polyethylene, it will be able to conserve when filled, the mechanical counter pressure referred to is advantageously applied to the opposite side of the article at this time, so that the bottom is in effect flattened out by the air or gas against a moving backing plate, and possibly within confining side walls. Apart from the formation of shape-retaining corners or sharp bends in the package material, this expedient enables the marginal "tail" of the package (representing the bottom sealing seam and any excess material beyond it) to be turned back against the outer face of the shaped bottom.

The principle of inflating with fluid can, moreover, usefully be combined with an internal gas treatment of the package, for example by using a sterilizing gas or a neutral gas such as nitrogen as the inblown fluid. The latter possibility is of particular importance when it is desirable to package contents in a neutral or air-free atmosphere; the inblown gas scavenges the air and rids the package of any pockets of air which might otherwise be trapped in it when it is charged with the intended contents.

It will be understood that the stage in the production of the package at which the upper end is closed will depend on the method which is employed to charge it with contents.

Thus the package, after having been provided with its bottom closure seam, may be charged through its open top and the latter then closed or, the top having first been closed, charging may take place through an opening furnished by a perforation or slit in a wall of the package.

Charging of the package through the open top can conveniently be carried out immediately following the blocking out of the bottom, and the package will conveniently be held in the same way and by the same means during both these operating phases. This is readily accomplished where the package is formed from a section of gussetted tubing, when the section can be held by gripping devices engaged between the side pleats to allow the insertion of a nozzle for blowing in the fluid followed by insertion of a charging means.

In one form the closure is very conveniently provided by a heat sealing seam, and the access indicating tab or the like is subsequently adhered to the closed package. This tab or the like may be associated with a tear-off corner, a pull strip or wire to open the upper end, or like expedients for access to and dispensing of the contents.

The access-indicating tab or the like may, however, be adhered over an opening, or a weakening which has previously been impressed in the wall of the package or package blank and which can be poked through, to give access to the interior of the package, after the tab has been removed by a user. Thus, for instance, a weakening of semi-circular, of V or T shape may be pressed into the wall of the package at a stage prior to the filling of the latter.

In another alternative the closure may be afforded by a tear-off strip which is adhered over the mouth of the open topped package. This arrangement is particularly useful where a large opening is required, when the package is in use, as for example in the case of ice cream, in view of the large width of opening which it makes available.

Within the method according to this invention, however, it is possible for the upper end of the package to be closed, e.g. by a transverse heat sealed seam, before the package is charged with its prescribed contents, and this latter operation may then be carried out through an opening formed in the package wall, this opening thereafter being closed by an access-indicating tear-off tab, wafer or the like.

Again, it is to be appreciated that the stages at which the upper and bottom ends of the tubing section are seamed may be arranged otherwise than is indicated above. It is conceivable, for example, in cases where the package is filled after sealing, that they may be performed simultaneously.

It will also be understood that treatments additional to those described, for example printing, may be carried out on the parent stock, on the blanks, or on the packages.

A preferred example of the method according to this invention and typical end products resulting therefrom are illustrated in the accompanying drawings, in which:

FIGURE 1 is an exploded perspective illustration of a first stage in the separation of an individual package blank from a continuous length of parent stock, FIGURE 2 illustrates two succeeding stages in the package formation, FIGURE 3 illustrates a later and bottom blocking out procedure, FIGURE 4 the stage in which the package is charged with the intended contents, FIGURE 5 illustrates and indicates the general appearance of one form of package in accordance with the present invention, FIGURE 6 shows the upper part of a modified form of package.

In the method to be described the blanks for the individual packages are formed by successively cutting off sections from a length 1 of flattened gusseted tubing of semi-rigid polyethylene. In performing this operation the tubing 1 is intermittently advanced by the required blank length through a cutting device 2 to a tube supporting means, including a table 3. The tubing 1 is passed through a slot 4 in the device 2 and the actual severance is performed by a knife 5, the cutting stroke of which is timed with the movement of the tubing. The supporting means further includes a gripping device which is shown in FIGURE 1 in simplified form as comprising a backing plate 6 and a pair of gripper jaws 7 which enter the longitudinal gussets 8 in the tubing 1 and move towards the leading edge of plate 6 so as to press one panel of the pleats against the plate. In this condition the section 9 is cut off, in effect in half folded condition.

These supporting means then present the covered blank 9, gripped in the condition indicated, to a heat-sealing arrangement which forms a single transverse seam across the complete width of the trailing part of the section, i.e. the intended bottom of the finished package, thereby uniting the pleats or gussets and the main front and rear walls of the section of tube all together. This is illustrated in FIGURE 2 where it is assumed that the gripping device 6, 7 has transferred the section 9 to a position in which a pair of heated jaws 10 move in to produce the transverse seam referred to.

FIGURE 2 also illustrates the next stage in the procedure, in which an anvil in the form of a bar 11 is inserted through the open upper end of the section or blank 9 and forms a backing for a punching tool 12 which is pressed against a part of the wall of the tube towards the upper end of the latter with a force sufficient for the edge 13 of the tool to form a semi-circular weakening line 14, but not an actual perforation, in the wall.

In the next stage (see FIGURE 3) a blowing pipe 15 is introduced into the open half of the upper end of the package blank 9, and a clamping block 16 is brought against the outer wall of this upper end part so as to close it around pipe 15. It will be noted that, at this stage, the other half of the pleated end of the package is held by the gripping device 6, 7. Air, or an inert gas under pressure, is blown through the pipe into the blank 9 so distending it and opening out the gussets. A counter-pressure is used to assist this operation by moving a ratchet plate 17 against the lower end of the package, now closed by the seam 18 made between the jaws 10. The plate 17 ensures that the bottom corners of the package are properly formed and at the same time serves to press up any "tail," such as 19, which may be left depending from the seam 18.

The container thus having been prepared for charging, in the next stage (FIGURE 4) a nozzle 20 is introduced into the half open upper end of the package blank 9, still held by the gripping device 6, 7, and the wall of the package is clamped against this pipe by a bar 21.

The package having been filled with the intended contents, after removal of pipe 20, the package is closed, in the case now under discussion, by heating jaws 22 (FIGURE 5) which form a single heat sealed seam transversely across the upper margin, i.e. uniting all the adjacent folds of the flattened gussetted tube.

For this purpose the grippers 7 may be swung aside to allow the second pleat in the upper end of the package to be folded against the first pleat, and then swung back again to retain the completely flattened upper end of the package during the introduction of the heat sealing jaw.

In the next stage the lower part of a tab 23, e.g. of metal foil coated with polythene thermoplastic, is adhered to the package over the weakening line 14, leaving the upper part of this tab standing proud so that it can be readily gripped by a user and torn away to give access to the potential entry into the sealed container.

It will be understood that the steps of the method described can be carried out in automatic sequence in a machine in which a plurality of packages can be dealt with in succession.

It will also be understood that modifications of the invention are possible. For example the distension of the bottom part of the container, during the sequence described, might in some instances be effected by the filling contents alone, where the particular material of the package, the density of the filling material, and the pressure at which it is introduced, allow.

Again, instead of forming a final closure by a transverse seam as described, this closure may be in the form of a strip which is adhered over the adjacent lips of the package. An example of this character is seen in FIGURE 6 in which the package is assumed to be filled with a material, such as ice cream to which it is desirable to have a large opening when the package is used. For this reason, the step of sealing the upper end of the container, used in the preceding embodiment, is omitted and a strip 24 of suitable material, e.g. of metal foil or stiff paper, is adhered over the layers of packaged material flattened together at the upper end of the latter. This strip can be arranged to be torn off for access to the interior of the package.

We claim:

1. A method of producing a container filled with pourable contents, comprising the steps of: severing a length of gussetted and flattened semi-rigid thermoplastic tubing from a web of such material having inwardly folded pleat-like gusset portions along each of its outer longitudinal edges, closing said length of material at one end at least by a heat sealed seam, gripping one outer fold of each folded pleat-like gusset portion on one side of the container in the vicinity of the unsealed end of the container, introducing a nozzle into the opening thus left by reason of the other outer folds not being gripped, clamping the free side of the open end around the nozzle and against the gripped edge so as to render the container substantially fluid tight, introducing fluid under pressure through said nozzle and applying a mechanical counter pressure against the heat-sealed end of the container during the introduction of fluid under pressure to straighten said folded pleat-like gusset portions to form sides of the container while folding over the tail portion formed by said heat seal and blocking out the heat-sealed end of the container, introducing the pourable contents into the blocked out container, and closing the container.

2. A method as claimed in claim 1 further comprising the steps of (a) forming at least a weakened portion in a surface of the container before the contents are introduced thereinto, and
(b) sealing an access-indicating sticker over the weakened portion.

3. A method as claimed in claim 1 wherein the other end of the container is closed by heat sealing the opposed edges together.

4. A method as claimed in claim 1 wherein the other end of the container is closed by
(a) clamping the opposed edges together, and
(b) folding and sealing a strip of material over the clamped edges.

5. A method as claimed in claim 1 wherein
(a) an access opening is formed in a flattened surface of the material and both ends of the severed length of material are closed before the introduction of any contents
(b) the pourable contents are introduced into the container through the formed access opening,
(c) the container is closed by sealing an access-indicating sticker over the access opening.

References Cited in the file of this patent
UNITED STATES PATENTS

| | | |
|---|---|---|
| 1,789,281 | Becker et al. | Jan. 13, 1931 |
| 2,218,670 | Bennett | Oct. 22, 1940 |
| 2,292,295 | Royal | Aug. 4, 1942 |
| 2,779,144 | Nail | Jan. 29, 1957 |
| 2,826,349 | Hovland | Mar. 11, 1958 |
| 2,861,406 | Holsman et al. | Nov. 25, 1958 |
| 2,949,712 | Bieberdorf et al. | Aug. 23, 1960 |
| 2,962,843 | Hoelzer et al. | Dec. 6, 1960 |
| 2,964,226 | Nerenberg | Dec. 13, 1960 |